United States Patent Office 3,199,927
Patented Aug. 10, 1965

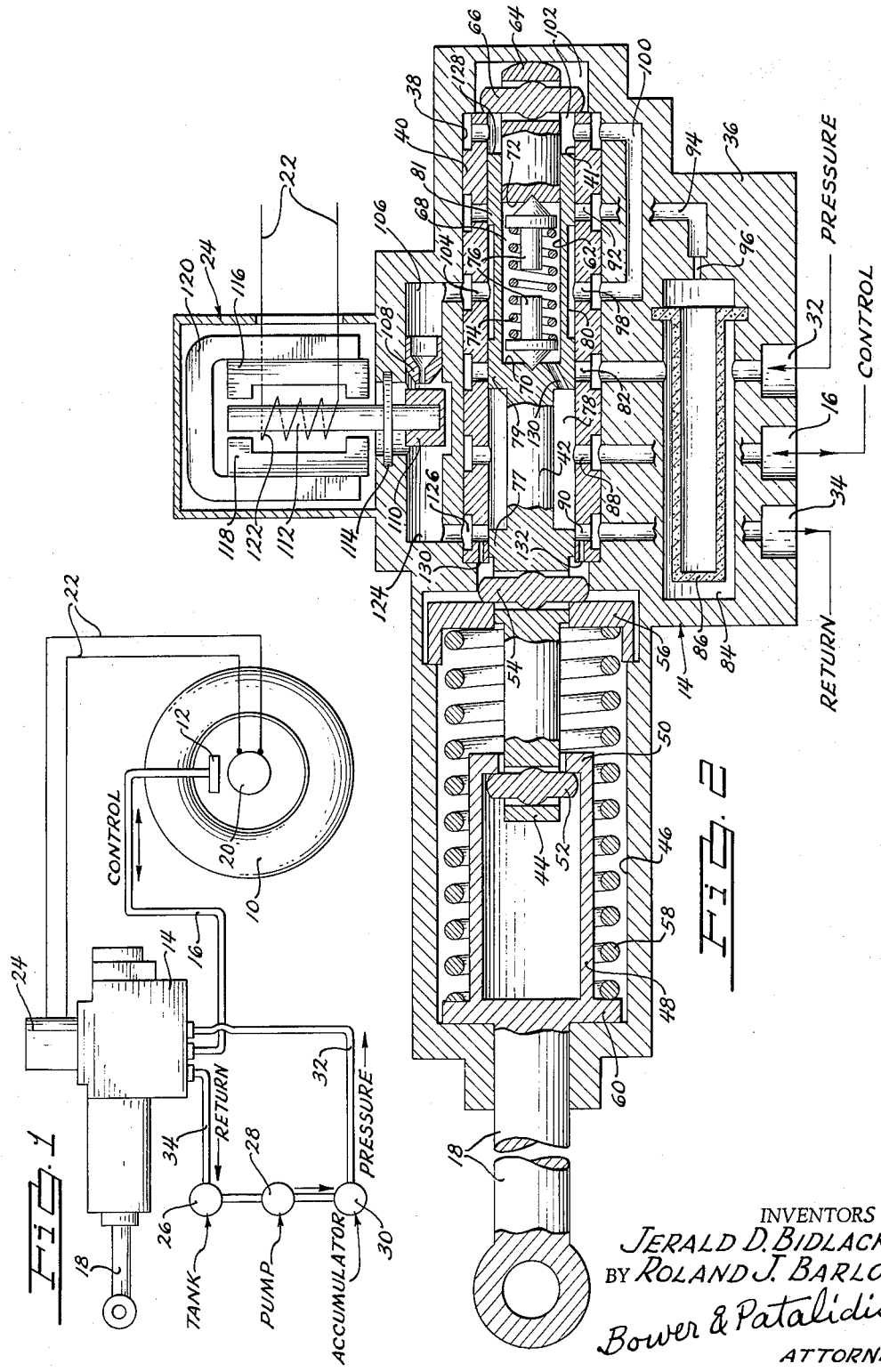

3,199,927
ANTI-SKID BRAKE CONTROL MECHANISM
Jerald D. Bidlack, Fraser, and Roland J. Barlow, Madison Heights, Mich., assignors to Cadillac Gage Company, Roseville, Mich.
Filed July 10, 1961, Ser. No. 122,845
6 Claims. (Cl. 303—21)

The present invention relates to a brake control mechanism, and more particularly to a mechanism for preventing skidding of a vehicle wheel caused by excessive brake application.

It is well known that the braking deceleration of a vehicle is dependent upon the frictional engagement of the wheel tire with the surface upon which the wheel is rolling. It is also well known that maximum braking deceleration is attained at a value of the braking power which still permits the wheel to rotate while being just below that value which would cause locking and skidding of the wheel. In vehicle operation it has been found that skidding wheels render the vehicle uncontrollable and unsteerable and may cause flat spots to appear on the tread surface of a tire, or may even result in dangerous blowouts of pneumatic tires.

It is, therefore, highly advantageous, whenever a wheel is locked or is about to be locked, to decrease brake pressure until the wheel has resumed a normal rotational velocity. Brake control devices for automatically accomplishing such brake release and for automatically reapplying the brake when the wheel has ceased to be in a locked condition are particularly useful in connection with automotive vehicles, railway vehicles, aircraft and the like. Automatic control of braking is especially desirable in connection with modern aircraft which have become increasingly larger, heavier and faster, making increasingly more difficult for pilots to manually apply the right amount of braking pressure to produce maximum deceleration for all the varied landing conditions. Since the present invention provides a brake control system that is particularly well adapted for use in aircraft, it will be described primarily in reference to that use, although it must be understood that the principles of the invention are also applicable to many other types of wheeled vehicles.

The invention contemplates a brake control mechanism that employs sensing means capable of detecting a condition characteristic of an early stage of wheel skid. An abnormally rapid wheel deceleration is a convenient indication of such a condition, and an inertia device carried by the wheel is a remarkably well suited skid sensing means usable in combination with the present invention. The inertia device may be adapted to supply an electric signal which is a function of the deceleration of the wheel, and that electric signal is used, through the appropriate converting means, to modify the control fluid pressure, as will be hereinafter described.

It is therefore a principal object of this invention to provide an improved anti-skid brake system for obtaining maximum effectiveness of the brakes.

It is another object of this invention to provide a brake control that will not permit a wheel to become locked.

A further object of the invention is to provide a brake control that enables the operator to apply at all times maximum braking power without requiring him to use reduced power under slippery condition of the ground, inasmuch as the invention is automatically applying the maximum braking power attainable under critical conditions of borderline friction engagement of the braked wheel tire with the ground.

Still a further object of the invention is to provide a brake control which automatically decreases the braking force being applied to a wheel rolling on a ground surface in response to an electrical signal supplied by a suitable sensing device detecting the imminence of a locked wheel condition, and which automatically increases the said braking force as soon as the sensing device has detected that the wheel is rotating normally.

One more object of the invention is to provide a brake control mechanism having the aforementioned advantages without feeding undesirable interaction on the mechanical input member controlled by the vehicle operator.

It is another object of the invention to permit a manual override of the automatic brake control when so requested by the vehicle operator, or in the event of malfunction of the automatic mechanism.

Still another object of the invention is to enable the vehicle operator to release the brake, even though the control mechanism is malfunctioning in such a way as to cause the braking pressure to remain applied to the wheel retarding device.

Other objects and advantages of the present invention will become apparent upon reading of the following description in conjunction with the accompanying drawings, which are intended only as an illustration and not as a limitation upon the scope of the invention. It will be understood that many changes and omissions may be made in the particular mechanism described without departing from the proper scope and spirit of the invention which are defined in the appended claims.

In the drawings:

FIG. 1 is a diagrammatic drawing representing an illustrative braking system in accordance with the invention, as it may be installed in a wheeled vehicle such as an aircraft; and FIG. 2 is longitudinal section of a brake control mechanism showing schematically the construction of a device in accordance with the present invention.

Referring first to FIG. 1 of the drawings, numeral 10 represents diagrammatically a vehicle wheel, the rotation of which can be braked by a wheel retarding device 12 actuated by pressurized fluid supplied from a brake control mechanism 14 by means of the conduit or pipe 16. The brake control mechanism 14 is actuated by a manually operable control rod 18, and it is contemplated that one such brake control mechanism is used for each wheel of the vehicle.

The wheel carries a skid sensing device 20, which may be an electric generator, or preferably an inertia device supplying an electrical signal proportional to the deceleration of the wheel. Electric wires 22 connect the skid sensing device to an electrical torque motor 24, which is part of the brake control mechanism 14 and whose functions will be explained hereinafter.

Pressurized fluid for the actuation of the brake is supplied from an accumulator 30 by means of a conduit or pipe 32. Exhausted fluid is returned by a conduit or pipe 34 to a sump or tank 26, from which it is pumped and pressurized by a pump 28 into the accumulator 30.

The brake control mechanism 14, shown schematically in FIG. 2, comprises a casing 36 having a cylinder bore 38 therein. A sleeve 40 is fixedly disposed within the bore 38 and a valve spool member 42 is slidably disposed within the inner bore 41 of the sleeve 40. The valve spool member 42 has an integral rod-like element 44 projecting into a second bore 46 in the casing 36.

The manually operable control rod 18 has an enlarged body portion 48 which is hollow to enable the end of the rod-like element 44 to be disposed coaxially therein. The body portion 48 has an inwardly turned flange 50 disposed to be engageable with the pin 52 disposed in a radial hole proximate the end of the rod-like element 44. A second pin 54, similarly disposed in a radial hole proximate the left end, as seen in the drawing, of the valve spool member 42, acts as an abutment for a flanged washer 56. A coil spring 58, concentrically disposed around both the control rod enlarged body portion 48 and the rod-like element 44, has one end bearing against the flanged washer 56 and the other end bearing against a shoulder 60 integral with the said enlarged body portion 48.

The valve spool member 42 has, at its rightmost end, a hollow portion with a bore 62 partially surrounding a cylindrical reaction member 64 restrained against linear motion by means of a pin 66 abutting against the end of the sleeve 40. Within the inner cylinder 68 thus formed in the hollow portion of the valve spool member and limited by end walls 70 and 72, there is disposed a return coil spring 74 mounted around the seating members 76—76. The return coil spring 74 normally forces the valve spool member to its leftmost position, as illustrated in the drawing.

The valve spool member 42 has two undercut portions on its outer diameter defining respectively annular chamber 78 comprised between the land portions 77 and 79, and annular chamber 80 between the land portions 79 and 81. A plurality of ports lead into the inner bore 41 of the sleeve 40, to admit and exhaust fluid to the different parts of the device, as will be hereinafter explained when describing the operation of the invention.

In its normally inoperative condition, the manual input control rod 18 is restrained in a leftward position by the coil spring 58 and the valve spool member 42 is restrained in a leftward position by the coil spring 74. Pressure port 82 is closed. Pressure port 82 is at all times in communication with a filter chamber 84, containing a filter element 86, which is supplied with pressurized fluid by the pressure pipe 32.

Pressure port 82 being closed, control port 88 is placed in communication through annular chamber 78 with return port 90 and no fluid pressure is supplied to the wheel retarding device.

Displacement of the manual input control rod 18 to the right applies a force to the spring 58 which is transmitted to the flanged washer 56 and the pin 54. As soon as this force is larger than the opposing force of the return coil spring 74, the valve spool member 42 is displaced to the right. Port 92, which is supplied with fluid under reduced pressure from the filter element 86 by means of the passageway 94 and flow restricting orifice 96, is placed in communication with the annular chamber 80. A port 98 in the annular chamber 80 communicates, by means of the bypass 100, with an annular space 102, and another port 104 exhausts the annular chamber 80 through a channel 106 to a nozzle 108. Fluid flowing past the nozzle 108 is exhausted to return pipe 34 by means of passageway 124 and annular conduit 126. The whole interior of the bore 46 is, at all times, filled with return fluid via passageways such as 130–132.

Proximate the nozzle 108 there is target 110 fastened on an armature rod 112 which is in turn flexibly mounted by way of a diaphragm 114 having its periphery fixed with respect to the casing 36 of the device. The armature rod 112, which is part of a torque motor designated generally by numeral 24, is longitudinally mounted between the pole pieces 116–118 placed within the polarizing magnet 120. A coil 122 surounds the armature rod 112 and the coil 122 is connected to the skid sensing device by means of the wires 22—22.

The diaphragm 114 isolates the torque motor from the hydraulic portion of the device and develops binding forces acting upon the armature rod whenever the armature rod is deflected from its neutral position.

With no electric signal supplied by the skid sensing device, the armature rod is in a neutral position, with the target 110 positioned a predetermined substantially short distance away from the nozzle 108. When the skid sensing device supplies an electrical signal to the coil 122 the magnetic flux existing between the pole pieces 116–118 is altered and there is created a force which pivots the armature rod 112 counterclockwise, thus bringing the target 110 in closer proximity to the nozzle 108. The flow of fluid at the nozzle 108 is restricted, thereby increasing the pressure in the annular chamber 80. The pressure existing in the annular chamber 80, and consequently in the annular space 102, is therefore comprised between the supply pressure and the return pressure and its action on the reduced piston area 128 of the valve spool member 42 in chamber 80 is proportional to the flow restriction at the nozzle 108, or otherwise stated, is proportional to the signal supplied by the skid sensing device. With no signal from the skid sensing device a small preload force is nevertheless applied to the piston area 128 which must be overcome by an increase in input force manually applied to the control rod 18.

With sufficient force being thus applied to the control rod 18, the valve spool member 42 is further displaced to the right. Pressure port 82 is then opened to the annular chamber 78 at the same time as return port 90 is closed. Control port 88 is thus supplied with pressure fluid which is allowed to thereby flow to the wheel retarding device by means of the control pipe 16. At the same time the fluid under pressure present in the annular chamber 78 is vented to the inner cylinder 68 via passageway 130 placing at all times the annular chamber 78 and the inner cylinder 68 in communication one with the other. A pressure corresponding to the pressure being supplied to the wheel retarding device is consequently applied to end wall 70, resulting in a leftward force on the valve spool member 42. This feedback force balances the force applied to the manual input control rod and maintains the valve spool member 42 to a position where the pressure port 82 is just open. Should the force be reduced from the manual input control rod, the pressure in the inner cylinder 68 will cause the valve spool member 42 to move to the left and to open the return port 90 until a new condition of equilibrium is reached. Should the force be increased upon the manual input control rod, the valve spool member 42 will be caused manually to move to the right to open the pressure port 82 in such a way as to increase the flow of pressure fluid and therefore as to increase the pressure until a new condition of equilibrium is reached.

It can thus be seen that for any position of the input control rod the amount of pressure being delivered to the wheel retarding device is proportional to the input rod displacement to the right resulting in a correspondingly proportional displacement of the valve spool member 42 also to the right, the equilibrium position of the valve spool member being determined by the force transmitted by the coil spring 58 in one direction, and the force applied in the opposite direction resulting of the algebraic sum of the forces exerted upon end wall 70 and piston area 128. The equilibrium position of the valve spool member in turn determines the amount of pressure being supplied to the wheel retarding device by regulating the amount by which the supply port 82 is opened to the annular chamber 78. As long as the vehicle wheel is rotating normally, the retarding force is therefore proportional to the amount of displacement to the right of the manual input control rod.

As previously mentioned, when the torque motor 24 is actuated by the skid sensing device, the target 110 is brought closer to the nozzle 108, further reducing the flow of fluid through the nozzle. This reduction in flow increases the pressure of the fluid in the annular chamber 80 and consequently in the annular space 102. The force exerted upon the exposed piston area 108 of the end of the valve spool member 42 increases and moves the valve spool member to the left, thereby closing the pressure port 82 and venting the control port 88 to the return port 90 and the return pipe 34. This action results in a reduced fluid pressure being applied to the wheel retarding device, thus preventing the wheel from becoming locked.

As soon as the wheel is rotating normally, the electric signal sent by the skid sensing device causes the target 110 to increase the gap between it and the nozzle 108. The flow of fluid through the nozzle 108 is increased and the pressure in the annular space 102 is consequently reduced. The valve spool member 42 is displaced again to the right, reopening the supply port 88 and reapplying full brake pressure to the wheel retarding device. This action is automatic and feeds no undesirable effect back to the manual input control rod.

The automatic functioning of the brake control device can be overridden when so desired by supplying to the mechanical input control rod 18 a force sufficient to compress the spring 58 to the point where the flange 50 is permitted to engage directly with the flanged washer 56, causing direct displacement of the valve spool member 42 in a rightward direction. The pressure port 82 is then wide open, thus delivering full emergency pressure to the wheel retarding device regardless of the condition of the electric torque motor modulating effect and regardless of the normal pressure feedback.

In the event of malfunction causing the valve spool member to remain in a rightward position, the brakes can be manually released by pulling the manual control rod 18 to the left causing the inner side of the flange 50 to engage the pin 52 in the rod-like element 44. The valve spool member 42 is thus displaced manually to a leftmost position closing the pressure port 82 and venting the control port 88 to the return port 90.

It is of particular interest that when the brake control device of the invention is in its normally inoperative condition, as illustrated in FIG. 2, the valve spool member 42 occupies a position which cuts off ports 82 and 92 connected to supply pressure. Under these conditions, and with a properly fitted assembly, no leakage of fluid to return can take place and the fluid accumulator needs not supply any fluid to the brake system, except during actual application of the brakes. Therefore, full fluid pressure is at all time available for brake application when needed and to actuate any other control or mechanism that may be connected to a common fluid pressure system as is normally the case in aircraft and the like.

Although the invention has been described in connection with a certain specific embodiment, the principles are susceptible of numerous other applications and of various changes in the form and relative arrangement of the parts that will readily occur to persons skilled in the art. Having thus described the various features of the invention, what is claimed as new and desired to be secured by Letters Patent is:

1. In a skid preventing brake control system for a vehicle wheel, the combination of: a source of fluid under pressure; wheel retarding means responsive to fluid pressure; sensing means supplying an electrical signal commensurate to the deceleration of the vehicle wheel; conduit means connecting said source of fluid to said wheel retarding device; and a control apparatus interposed in said conduit means, said apparatus comprising: fluid pressure inlet in fluid communication with said source of fluid pressure, fluid return outlet connected to conduit means for the return of exhausted fluid to a fluid pressurizing means, and control outlet in fluid communication with said wheel retarding means; manual input control means; valving and regulating means responsive to said manual input means for effecting a connection between said pressure inlet and said control outlet and for regulating the pressure applied to said wheel retarding means in function of the force actuating said manual input means; feedback means responsive to said electrical signal for disconnecting said pressure inlet from said control outlet and for venting said control outlet to said return outlet by direct action upon said valving and regulating means in the event that the vehicle wheel is skidding and for reconnecting said pressure inlet to said control outlet as soon as the vehicle wheel is rotating normally, said feedback means comprising a chamber to which is supplied fluid under pressure, an outlet nozzle from said chamber, target means adapted to restrict the flow of fluid through said nozzle in response to said electrical signal and means applying the increase of fluid pressure in said chamber as a function of the restriction of fluid flow through said nozzle as an input to said valving and regulating means.

2. A device according to claim 1 further comprising means integral with said manual input control means for actuating said valving and regulating means to supply full pressure to said wheel retarding means upon full stroke actuation of said manual input control means.

3. A device according to claim 2 further comprising means integral with said variable stroke manual input control means for actuating said valving and regulating means to exhaust fluid pressure from said wheel retarding means upon full return of said manual input control means.

4. In a skid preventing brake control system for a vehicle wheel, the combination of: a source of fluid under pressure; a wheel retarding device responsive to fluid pressure; a wheel skid sensing device supplying an electrical signal commensurate to the amount of deceleration of said vehicle wheel; conduit means connecting said source of fluid under pressure to said wheel retarding device; and a control and pressure modulating apparatus interposed in said conduit means, said apparatus comprising: a casing having a pressure inlet connected to the source of fluid under pressure, a control outlet connected to the wheel retarding device and a return outlet connected to means placing the fluid under pressure; a source of fluid under reduced pressure in said casing and consisting in a restricted outlet from a filter element whose inlet is connected to said pressure inlet; a bore in said casing having a pressure port connected to the pressure outlet, a control port connected to the control outlet, a return port connected to the return oultet, a bypass port connected to both a first feedback cylinder in said casing and to a fluid passageway in communication with said return outlet, and a reduced pressure port connected to the source of fluid under reduced pressure; a spool member slidably disposed within said bore and being normally urged by spring bias and by the pressure of fluid in the first feedback cylinder to an inoperative position closing the pressure port and the reduced pressure port and venting the control port to the return port; a manual input member adapted to compress a coil spring which in turn displaces the spool member toward an operative position where the reduced pressure port is placed in fluid communication with the bypass port and the pressure port is placed in fluid communication with the control port while the return port is disconnected from the control port; a second feedback cylinder for subjecting the spool member to a closing force proportional to the pressure existing in the control port; a nozzle restricting the flow of fluid through the fluid passageway between the bypass port and the return outlet; means responsive to the electrical signal supplied by the wheel skid sensing device for varying the flow of fluid through said nozzle whereby the pressure in the first feedback cylinder is increased when the vehicle wheel is skidding and reduced when the vehicle wheel is rotating freely, and means causing the pressure in the first feedback cylinder to displace the spool member to the inoperative position.

5. A device according to claim 4 further comprising means operated by the manual input member and engaging the spool member upon a predetermined deflection of the coil spring situated between said manual input member and said spool member for movement of said spool member to a fully operative position.

6. A device according to claim 5 further comprising means operated by the manual input member and engaging the spool member for emergency movement of said spool member to its inoperative position upon movement of said manual input member to a position corresponding to a full deactivation of the wheel retarding device.

References Cited by the Examiner

UNITED STATES PATENTS

| 2,239,459 | 4/41 | Kattwinkel. | |
| 2,597,598 | 5/52 | Robison | 303—54 |
| 2,624,361 | 1/53 | Brown | 303—54 |
| 2,854,289 | 9/58 | Schnell | 303—54 |
| 2,868,338 | 1/59 | Lucien et al. | 188—181 |
| 2,934,382 | 4/60 | Casler | 303—54 |
| 2,963,328 | 12/60 | Lucien | 188—181 |

EUGENE G. BOTZ, *Primary Examiner.*

A. JOSEPH GOLDBERG, ARTHUR L. LA POINT, *Examiners.*